US006308199B1

(12) United States Patent
Katsurabayashi

(10) Patent No.: US 6,308,199 B1
(45) Date of Patent: Oct. 23, 2001

(54) COOPERATIVE WORK SUPPORT SYSTEM FOR MANAGING A WINDOW DISPLAY

(75) Inventor: Hiroshi Katsurabayashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/130,515

(22) Filed: Aug. 7, 1998

(30) Foreign Application Priority Data

Aug. 11, 1997 (JP) .................................................... 9-216500

(51) Int. Cl.[7] .................................................... G06F 15/16
(52) U.S. Cl. ............................ 709/204; 709/205; 709/203
(58) Field of Search .................................... 709/204, 205, 709/203, 250, 232

(56) References Cited

U.S. PATENT DOCUMENTS

| 5,107,443 | * | 4/1992 | Smith et al. | 364/419 |
| 5,391,400 | * | 2/1995 | Berkowitz et al. | 395/200 |
| 5,721,852 | * | 2/1998 | Porter | 395/349 |
| 5,844,553 | * | 12/1998 | Hao et al. | 345/329 |
| 5,991,796 | * | 11/1999 | Anupam et al. | 709/206 |
| 6,061,440 | * | 5/2000 | Delaney et al. | 379/202 |
| 6,151,020 | * | 11/2000 | Palmer et al. | 345/329 |

FOREIGN PATENT DOCUMENTS

| 3-58658 | 3/1991 | (JP) . |
| 3-119476 | 5/1991 | (JP) . |
| 3-273443 | 12/1991 | (JP) . |

OTHER PUBLICATIONS

M. Stefik et al., WYSIWIS Revised: Early Experiences with Multiuser Interfaces, ACM Transactions on Office Information Systems, vol. 5, No. 2, Apr. 1987, pp. 147–167.
Hiroshi Ishii, Team WorkStation: Towards a Seamless Shared Workspace, CSCW 90 Proceedings, Oct. 1990, pp. 13–26.
Look@Me Release Notes, Farallon Computing, Inc., Apr. 1996.

* cited by examiner

Primary Examiner—Zarni Maung
(74) Attorney, Agent, or Firm—Oliff & Berridge, PLC

(57) ABSTRACT

In an application sharing system in which a plurality of users can make discussions using a relationship among pieces of information extending to a plurality of application windows, there is provided the ability to select windows to be displayed and windows to be hidden for each user. In the system, an application included in one computer is shared by a plurality of computers connected through a network and display screens produced by the application are shared. In a computer having the shared application, whether to display or hide, for each user, windows displayed in the course of screen display shared other computers is controlled by a display control unit. There is provided a user information management unit that manages user information indicating for each user whether to display or hide each window. The display control unit determines whether to display or hide for each user, using the user information in the user information management unit.

5 Claims, 15 Drawing Sheets

SCREEN SHARING SYSTEM

APPLICATION SHARING SYSTEM

COOPERATIVE WORK SUPPORT SYSTEM FOR MANAGING A WINDOW DISPLAY

BACKGROUND OF THE INVENTION

1. Field of the Invention

This invention relates to a cooperative work support system which displays a common screen on computer screens of a plurality of users to support cooperative work among the users through the screen display.

2. Description of the Prior Art

There is conventionally known a system in which shared data is displayed as a shared window on the display screens of computers of participants in a meeting via a computer network to exchange messages in real time among the meeting participants.

Well-known examples of a system of this type are Colab System (refer to M. Strefix, D. G. Bobrow, G. Foster, S. Lanning, and D. Tatar Xerox Palo Alto, Research Center "WYSIWIS Revised: Early Experiences with Multiuser Interfaces", ACM Transaction on Office Information Systems, Vol. 5, No. 2, April 1987, Pages 147–167) and MERMAID (refer to Japanese Published Unexamined Patent Application No. Hei 3-58658) by Nippon Electric Co., Ltd.

In a system of this type, for example, when a plurality of persons at remote locations are to hold consultations, a group for the consultations is formed by specifying the addresses of computers including workstations of the persons, and application programs required for the consultations, written on the assumption that they are used by a plurality of persons are started by a computer of their own. Data is exchanged among the application programs, application screens displayed on their computers are made exactly identical, and the results of operations performed within the shared window and changing displays are also made identical. As a result, individual operators can perform operations in each of the plurality of computers while sharing one application (e.g., white board tool) to conduct discussions.

This specification refers to as a screen sharing system the system in which communications are performed among a plurality of persons via a network by sharing screen displays and operations by a plurality of persons through input operation units such as a mouse and a keyboard in units of applications created on the assumption that they are used by a plurality of persons.

On the other hand, instead of displaying screens and performing input operations by means of a mouse, a keyboard, etc. in units of applications as described above, there is also known a system in which communications are performed among a plurality of persons by sharing screen displays of a window system in which a plurality of applications are displayed, and operations by a mouse, a keyboard, etc. performed through the window system.

Well-known examples of a system of this type are Team-Workstation of Nippon Telegraph and Telephone Corp. (refer to Ishii, Hiroshi. "TeamWorkstation: Towards a Seamless Shared Workspace" CSCW 90 Proceedings, October 1990, pp. 13–26 and Japanese Published Unexamined Patent Application No. Hei 3-119476), Timbuktsu, Look@Me (Look@Me Release Notes, Farallon Computing, Inc.), and a cooperative work system (e.g., refer to Japanese Published Unexamined Patent Application No. Hei 3-273443). This specification refers to a system of this configuration as an application sharing system.

The screen sharing system and the application sharing system described previously will be further described using the accompanying figures.

FIG. 15 describes a screen sharing system. That is, in this system, required application programs M written on the assumption that they are used by a plurality of persons are installed in computers A and B, and the application programs M are connected by a communication network N. User input units Ca and Cb such as a mouse, a keyboard, etc. and display units Va and Vb are connected to the computers A and B, respectively.

In this screen sharing system, input events from the user input unit Ca of the computer A are processed by the application M of the computer A and the processing results are displayed on the display unit Va, while the events are transferred to the application M of the computer B through the communication network N and processed, and the processing results are displayed on the display unit Vb of the computer B.

As a result, a window having identical processing contents of the application M is displayed on the display screens of the computers A and B. That is, each of input events from the user input units Ca and Cb is reflected common to the computers A and B. Accordingly, the owners of the computers A and B can perform cooperative work through the shared window while using the user input units Ca and Cb.

Next, FIG. 16 describes an application sharing system. Namely, in this system, a plurality of applications M including an application for managing windows shared by a plurality of computers are installed in a computer of one user. The applications M are not special ones written on the assumption that they are used by a plurality of persons, but usually can be general purpose applications used in individual computers.

In the application sharing system, with no modifications made to the general purpose applications, a shared device (shared module) is installed in each computer and the shared devices are connected by a communication network N.

In this system, although the applications M support only one user input unit because they are general purpose applications, the shared device performs control as if the operation inputs of user input units Ca and Cb of a plurality of computers A and B were the operations of a single user input unit for the applications M. The applications M of the computer A process input events by all user input units Ca and Cb and display the processing results not only on the display unit Va of the computer A but also on the display unit Vb of the computer B.

In this way, the application sharing system shares a plurality of applications M between a plurality of computers A and B, and window screens are identically displayed on the display screens Va and Vb by the applications M.

However, as described previously, the above-mentioned screen sharing system requires special applications written on the assumption that they are used by a plurality of users. Namely, there has been a problem that applications other than special ones written for shared use by a plurality of users cannot be shared by a plurality of persons.

Also, since a screen is shared in units of applications, when a mouse cursor goes out of the screen, the mouse cursor cannot be shared. For this reason, there has been a problem that, when discussions are made using a plurality of applications by a plurality of persons, it is difficult to make discussions and explanations based on information extending onto a plurality of windows of a plurality of applications. Further, even in an identical application, when different pieces of information are opened, they may be displayed as different windows, in which case the information extends onto a plurality of application windows.

On the other hand, according to an application sharing system, since general purpose applications can be used and applications (including an application for managing windows) of one computer manage user input units and display screen information of a plurality of computers, management of mouse cursors is facilitated and discussions can be made using a relationship among information items extending onto a plurality of application windows.

However, this application sharing system has a problem that information of all the opened windows is revealed to others and information that should be kept secret from others cannot be privately opened. The above-mentioned screen sharing system is also similar to the application sharing system in that all the meeting participants view the same screen and different participants cannot view a different screen. However, there are situations in which information should be revealed to specific persons but not to others during a meeting or consultation.

SUMMARY OF THE INVENTION

This invention has been made in consideration of the above problems and its object is to provide the ability to select windows to be displayed and those to be hidden in an application sharing system which allows a plurality of users to make discussions using a relationship among information items extending onto a plurality of application windows.

To solve the above-mentioned problems, this invention offers a cooperative work support system comprising: a communication unit that communicates with at least other computers; a user input unit that accepts a user's input operation and generates an event in response to the input operation; an event determination and distribution unit that judges the event generated in a local computer or the event sent from other computers through the communication unit, identifies an application to receive the event, and transfers the event to the identified application; a display unit that displays on a display screen the execution result of the application to which the event is transferred by the event determination and distribution unit; a display screen control unit that controls the display contents of the display screen; a display control unit that controls whether to display or hide windows displayed in the course of screen display shared with other computers; a shared screen computation unit that, when screen display information is updated according to the execution results of the application, computes the display information of a shared screen that is to be passed to other computers, based on control of the display control unit; and a sharing unit including: a function to pass events generated in response to input operations by the user input unit to other computers through the communication unit; a function to pass events generated in response to user input operations by the user input unit or events sent from other computers through the communication unit to the event determination and distribution unit; a function to pass display information of the shared screen that was computed by the shared screen computation unit, to other computers through the communication unit; and a function to pass display information of the shared screen that comes from other computers through the communication unit, to the display screen control unit.
[Action]

In this invention, input operations are performed through a user input unit, and when an event occurs, if an application exists in a local computer, the event is passed to the application through a sharing unit and an event determination and distribution unit, and application processing is performed according to the event.

If there is no application in a local computer, the event is sent to a computer in which an application is installed, through a network via a sharing unit and a communication unit, and it is passed to the application via a sharing unit and an event determination and distribution unit of the computer, and application processing is performed in accordance with the event.

When screen display information is updated according to the execution results of the application, the display information of a shared screen which is passed to other computers is computed by the shared screen computation unit according to the display control of the display control unit on a window basis. Namely, when windows displayed and those not displayed coexist, screen display information representing the situation is generated as the display information of a shared screen which is passed to other computers. The generated display information of the shared screen is sent to other computers via the sharing unit and the communication unit.

With the above-mentioned arrangement, according to this invention, the selection between displaying and not displaying can be made on a window basis and a situation secret to others can be established on a window basis during a meeting or consultation.

DESCRIPTION OF THE PREFERRED EMBODIMENTS

Hereinafter, embodiments of a cooperative work support system according to this invention will be described with reference to the accompanying drawings.

Figure 2:
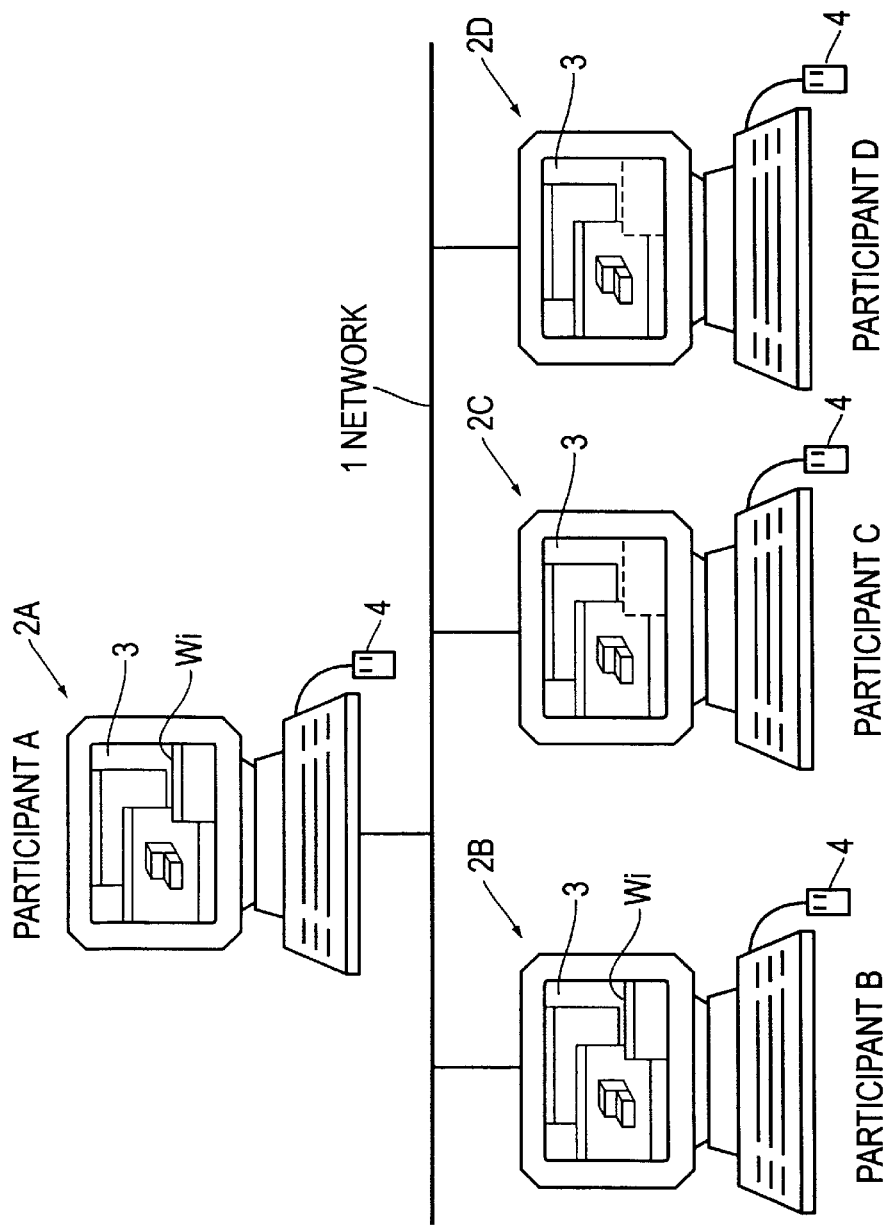
FIG. 2 shows an example of a configuration of an embodiment when a cooperative work support system according to the present invention is used in an on-site meeting.

FIG. 2 shows a configuration of a cooperative work support system of the embodiments used as a so-called on-site meeting and an example of an image of screens being used. In this case, a system is configured by a plurality of computers, four personal computers 2A, 2B, 2C, and 2D in this example, and participants A, B, C, and D attend a meeting as operators of cooperative work and operate their own personal computers 2A, 2B, 2C, and 2D at their seats to conduct cooperative work.

Although a system of the embodiments basically has the same configuration as the application sharing system described previously, the system can control whether to display or hide each window in shared screen display information displayed on the screen of the displays 3 of the personal computers 2A to 2D for each of the participants.

Namely, a plurality of applications including an application for managing windows, which are shared by the four participants A to D, are installed in one of the four personal computers 2A to 2D, e.g., a computer 2A. Information of a display screen shared by the participants is generated in a personal computer in which the application for managing windows is installed, is sent to other personal computers through a network 1, and is displayed on each of the displays 3.

When the participants A, B, C, and D perform an input operation such as writing for the purpose of the meeting by means of an operation input unit 4 such as a mouse and a keyboard through their own personal computers 2A, 2B, 2C, and 2D at their seats, the operation input information is accepted by the application for managing the window on which the input operation has been made, through the network 1 or within the relevant computer, and processing is performed according to the input operation.

The results of execution by the application are reflected on a corresponding display window. In this case, as described later, the computer in which the application for managing windows is installed controls whether to display or hide each window to or from each of the participants. On the basis of the control information, the computer determines, for each participant, which windows are to be displayed on the display screen shared with other participants, and generates, for each participant, the shared screen display information described previously. The screen display information is generated for each participant and is sent through the network 1 to the other participants' computers which do not have the application.

In this way, the plurality of personal computers 2A, 2B, 2C, and 2D exchange data through the network 1 and a screen shared by the participants A to D is displayed in a so-called multi-window display form in a controlled manner that displays or hides windows for each participant, rather than a common screen having exactly the same contents being displayed.

The example of FIG. 2 shows the situation in which an application installed in the personal computer 2A of the participant A, for example, is shared by the four participants A to D to conduct a meeting. The personal computer 2A performs control so that all the windows are displayed to the participant B and one window Wi is not displayed to other participants C and D.

[First Embodiment]

Figure 1:
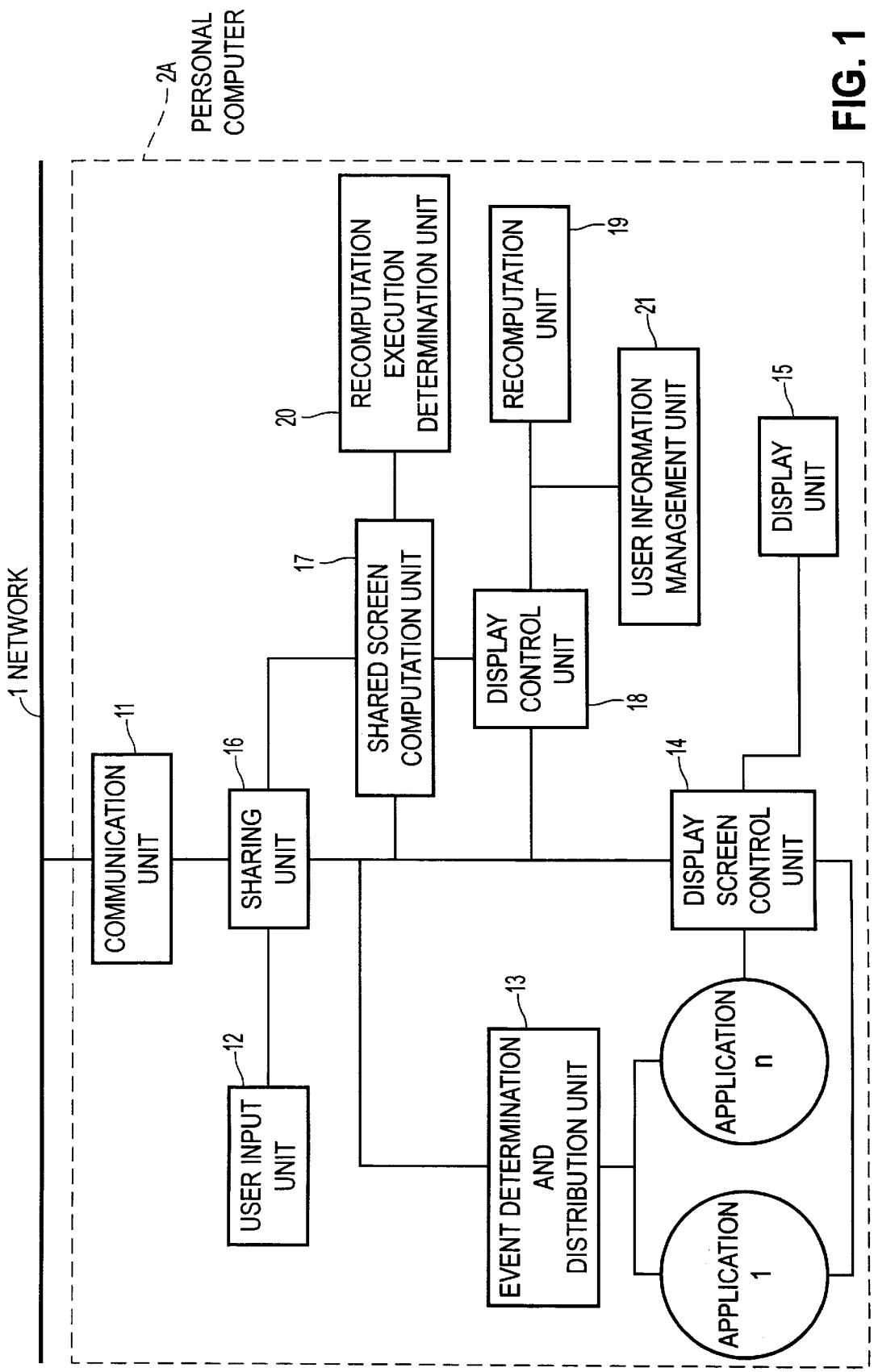
FIG. 1 is a functional block diagram for major units of a first embodiment of a cooperative work support system according to the present invention.

To perform the above processing, the personal computers 2A, 2B, 2C, and 2D each include a variety of processing function units shown in FIG. 1. The processing function blocks shown in FIG. 1 are actually implemented by software of each personal computer.

Namely, FIG. 1 shows a block diagram of processing functions of one of the personal computers 2A, 2B, 2C, and 2D, for example, the personal computer 2A. Other personal computers also have exactly the same processing functions.

In this embodiment, the personal computer includes the following processing function units as shown in FIG. 1: a communication unit 11, a user input unit 12, an event determination and distribution unit 13, a display screen control unit 14, a display unit 15, a sharing unit 16, a shared screen computation unit 17, a display control unit 18, a recomputation unit 19, a recomputation execution determination unit 20, and a user information management unit 21. The personal computer includes a plurality of applications (programs) including an application for managing windows.

The communication unit 11 transfers user operation input data, screen display information, and other information to and from other personal computers 2B to 2D through the network 1. The communication unit 11 can be connected to Ethernet, a network configured with telephone lines, or a bus within a computer. It can also be connected to other computers through a serial port such as RS232, parallel port, and infrared rays.

The user input unit 12 gets user input data from the operation input unit 4 of the personal computer such as a keyboard, mouse, and tablet shown in FIG. 2, and outputs event information such as mouse events and keyboard events. Mouse events are generated when the left button of a mouse is pressed, when the right button is released, when the mouse is moved with the left button pressed, or when the mouse is moved. Keyboard events are generated when a key on the keyboard, e.g., "s" is pressed.

The event determination and distribution unit 13 determines to which application software to transfer event information such as mouse events and keyboard events inputted from the user input unit 12 and the communication unit 11. Event information inputted from the user input unit 12 and the communication unit 11 is inputted to the event determination and distribution unit 13 through the sharing unit 16.

Applications perform operations on event information generated in response to user inputs transferred from the event determination and distribution unit 13 and send the operation results to the display screen control unit 14.

The display screen control unit 14, to display the results of application operations performed according to input event information, controls the display unit 15 to control the contents of windows associated with applications and the positions of windows on desktop. The display screen control unit 14 sends a screen update signal to the shared screen computation unit 17 when display screen contents have been updated.

The display unit 15 displays the computation results of the personal computer to users under control of the display screen control unit 14 wherein windows are on the desktop (display screen) and the computation results of application software are displayed in the windows.

Figure 16:
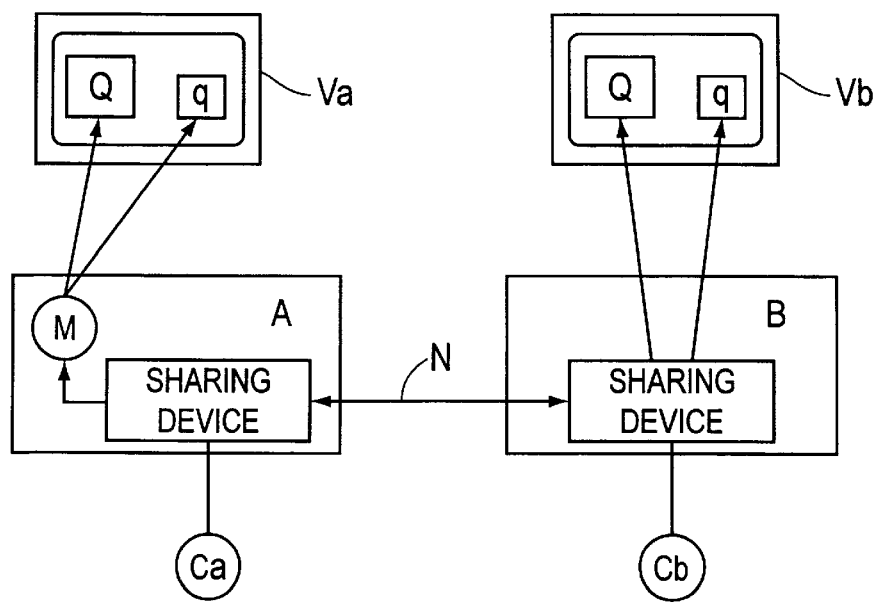
FIG. 16 is a diagram for explaining an application sharing system.

The sharing unit 16, which is a processing unit corresponding to a sharing unit shown in FIG. 16, receives event information from the user input unit 12, and when an application for managing a window in which the event occurs does not exist in the local personal computer, transfers the event information to a personal computer having that application through the communication unit 11. When the application for processing event information from the user input unit 12 exists in the local personal computer, the sharing unit 16 supplies the event information to the event determination and distribution unit 13. Accordingly, the sharing unit 16 recognizes in which personal computer the application shared among a plurality of participants in the meeting exists, and has the address of the computer on the network 1.

Also, to share a screen display with other computers, as described later, the sharing unit 16 converts the display information of a shared screen computed for each user in the shared screen computation unit 17 into the information to be distributed to a computer of each user and transfers it to the communication unit 11. Accordingly, the sharing unit 16 has a table giving a correspondence between the identifiers (user identifiers) of participants in the meeting and the addresses of corresponding personal computers on the network 1.

Furthermore, the sharing unit 16 examines information transferred from other personal computers through the network 1 and the communication unit 11, and transfers it to the display screen control unit 14 if it is screen display information, and to the event determination and distribution unit 13 if it is event information such as mouse events and keyboard events.

A screen update signal arrives from the display screen control unit 14 and the shared screen computation unit 17 inquires of the recomputation execution determination unit 20 whether to recompute the screen image of a shared screen. Only when an execution OK indication is returned, the shared screen computation unit 17 performs processing described below to perform processing for updating the respective screen images shared by other participants.

Namely, based on the screen display information computed in the display screen control unit 14, the shared screen computation unit 17 inquires of the display control unit 18 about the window information to be hidden. According to an indication of the display control unit 18 that is returned in response to the inquiry, the shared screen computation unit 17 computes a screen for each of the participants to share with other computers. Then, it sends the display information of a shared screen computed for each participant in the meeting to the sharing unit 16.

Upon receipt of the inquiry from the shared screen computation unit 17, the display control unit 18 inquires of the user information management unit 21, determines a window to be hidden for each user, inquires of the display screen control unit 14 to obtain the location and size of the window, and returns the obtained position and size to the shared screen computation unit 17.

Furthermore, the display control unit 18 sends to the recomputation unit 19 the information about the position and size of the window to be hidden to request recomputation, receives the bit map information, sent from the recomputation unit 19 in response to the request, of the screen display of the portion in which the window has existed when the window is not displayed, and sends it to the shared screen computation unit 17.

Upon receipt of the recomputation request from the display control unit 18, the recomputation unit 19 obtains information from the display screen control unit 4 using information about the position and size of a non-display window which was afforded from the display control unit 18, and when there is no window to be hidden, computes the screen information of the relevant window area.

The recomputation execution determination unit 20 determines whether to compute the screen image of a shared screen according to indications from users. The recomputation execution determination unit 20 is provided to solve the problem that, when a new application is started up by user's instruction, the window is unwillingly revealed to meeting participants from whom it is to be hidden, before it is actually hidden. Accordingly, the recomputation execution determination unit 20 determines whether an environment for recomputation is established with a new window already started up and a display or non-display indication for the window being set for each participant, and if established, returns an execution OK indication to the shared screen computation unit 17.

The user information management unit 21 manages information about windows to be displayed and windows to be hidden for each user.

Figure 3:
FIG. 3 is a diagram illustrating the data configuration of a management table showing whether to display or hide each window for each user wherein the table is possessed in a user information management unit in an embodiment of a cooperative work support system according to the present invention.

FIG. 3 illustrate the data configuration of a management table TBL showing whether to display or hide each window for each user wherein the table is possessed by the user information management unit 21 and a window ID is the identifier of a window displayed on a shared screen. As shown in FIG. 3, information on whether to display or hide each window for each is set so that a reference to the table TBL tells whether each window is to be displayed or hidden for each participant.

Next, the operation of major units of the functional blocks in FIG. 1 which are described above will be described with reference to the respective flowcharts.

Figure 4:
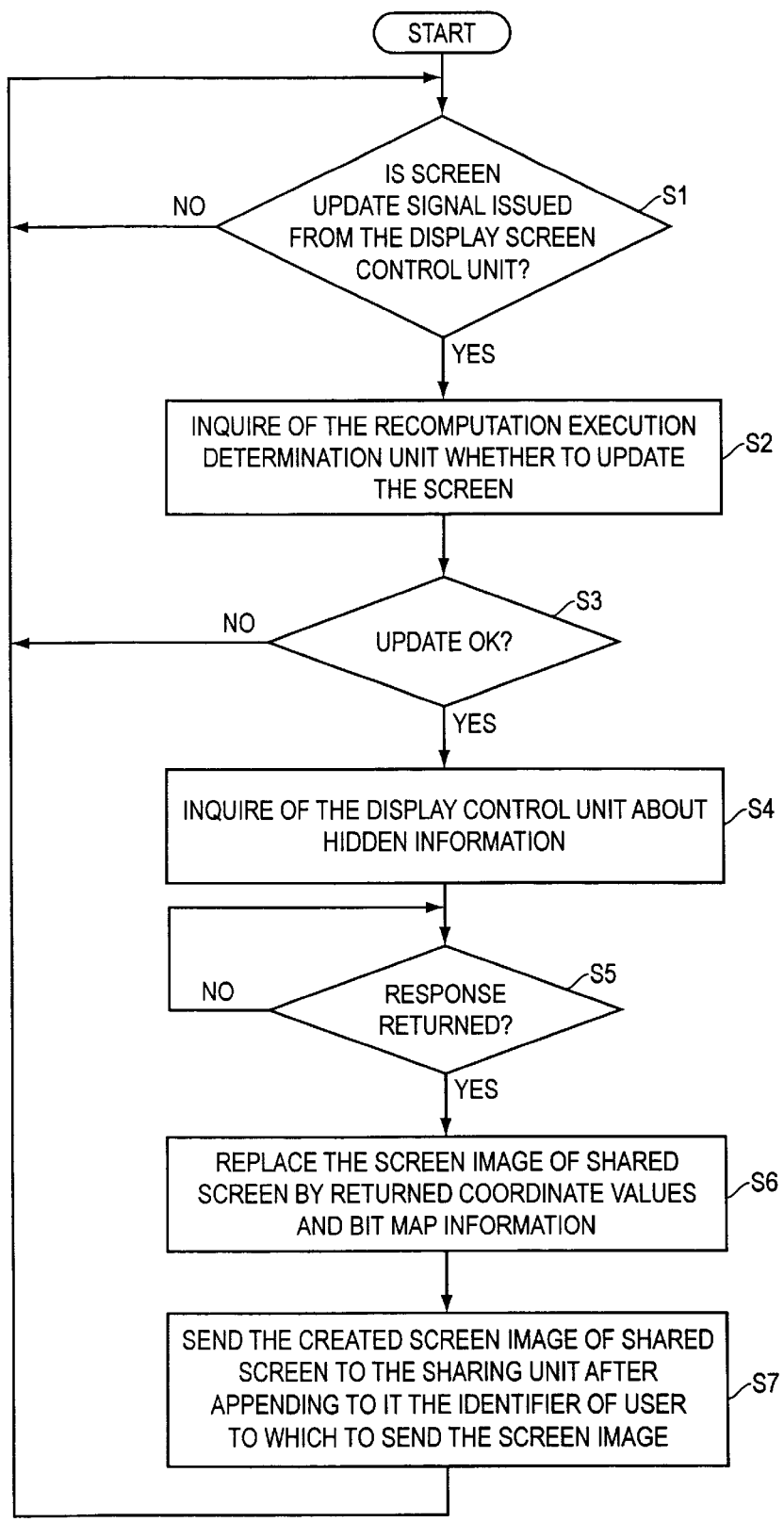
FIG. 4 is a flowchart showing an outline of processing of a shared screen computation unit in an embodiment of a cooperative work support system according to the present invention.

FIG. 4 is a flowchart showing an outline of processing of the shared screen computation unit 17. First, the shared screen computation unit 17 waits that a screen update signal arrives from the display screen control unit 14 (step S1), and when the screen update signal arrives, inquires of the recomputation execution determination unit 20 whether recomputation of the screen image of a shared screen can be started (step S2). The shared screen computation unit 17 judges an inquiry result from the recomputation execution determination unit 20 (step S3), and if a determination result of execution OK is not returned from the recomputation execution determination unit 20, returns to step S1 and waits that a screen update signal arrives from the display screen control unit 14.

On the other hand, if a determination result of execution OK is returned from the recomputation execution determination unit 20, the shared screen computation unit 17 inquires of the display control unit 18 about secret information (step S4). The shared screen computation unit 17 waits a response from the display control unit 18 (step S5), and if a response is returned, replaces the screen image of a shared screen for each participant by the coordinate values and bit map information contained in the response (step S6). The shared screen computation unit 17 sends the produced screen image of the shared screen to the sharing unit 16 after appending the identifier (user identifier) of a participant to the screen image (step S7). Subsequently, the shared screen computation unit 17 returns to the step S1 and repeats the above processing.

Figure 5:
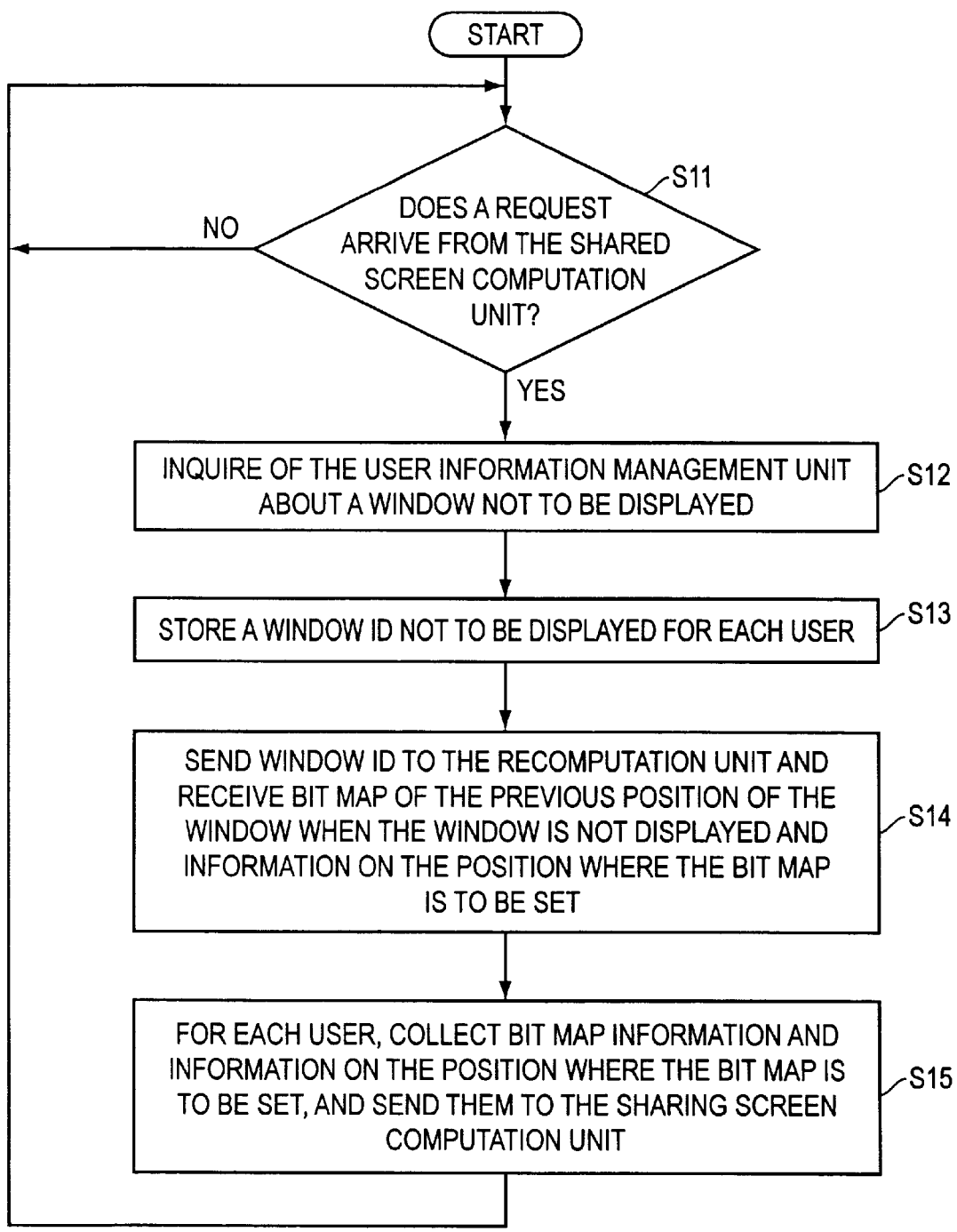
FIG. 5 is a flowchart showing an outline of processing of a display control unit in an embodiment of a cooperative work support system according to the present invention.

FIG. 5 is a flowchart showing an outline of processing of the display control unit 18. In this embodiment, a recomputation method is employed as a method for creating bit map information to fill the display area of a window to be hidden.

The display control unit 18 determines whether an inquiry request arrives from the shared screen computation unit 17 (step S11), and when an inquiry request arrives, inquires of the user information management unit 21 about a non-display window for each participant (step S12). The display control unit 18 stores, for each participant, the window ID of a non-display window which is sent from the user information management unit 21 (step S13).

Next, the display control unit 18 sends to the recomputation unit 19 the window ID of a window to be hidden for each participant, and receives the following information sent from the recomputation unit 19 as a result: bit map information of the position where the window has existed when it is not displayed, and information about the position where the bit map information is to be set (step S14).

Next, the display control unit 18, for each participant, collects the bit map information and the information on the position where the bit map information is to be set, and sends them to the shared screen computation unit 17 (step S15). Subsequently, the display control unit 18 returns to the step S11 and repeats the above processing.

Figure 6:
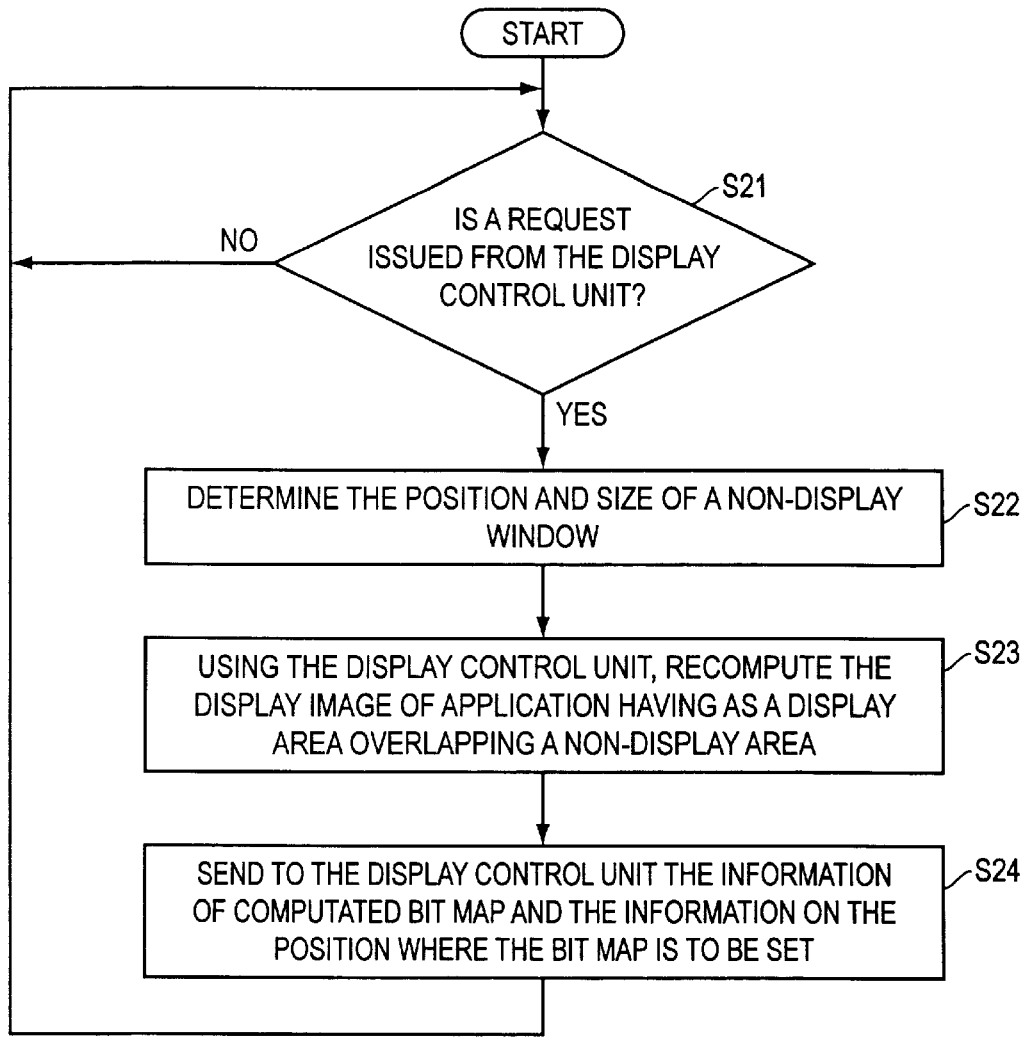
FIG. 6 is a flowchart showing an outline of processing of a recomputation unit in an embodiment of a cooperative work support system according to the present invention.

FIG. 6 is a flowchart showing an outline of processing of the recomputation unit 19.

First, the recomputation unit 19 determines whether a recomputation request is issued from the display control unit 18, and waits until a recomputation request arrives (step S21). When a recomputation request arrives, the recomputation unit 19 determines the position and size of a non-display window using the information about the position and size of a non-display window which is contained in the request (step S22).

Next, the recomputation unit 19 obtains information from the display screen control unit 14 and recomputes the display image of an application having as a display area an area crossing with the non-display area (step S23). The recomputation unit 19 sends to the display control unit 14 the bit map information of the computed display image and the information about the position where it is to be set (step S24). Subsequently, the recomputation unit 19 returns to the step S21 and repeats the above processing.

Figure 7:
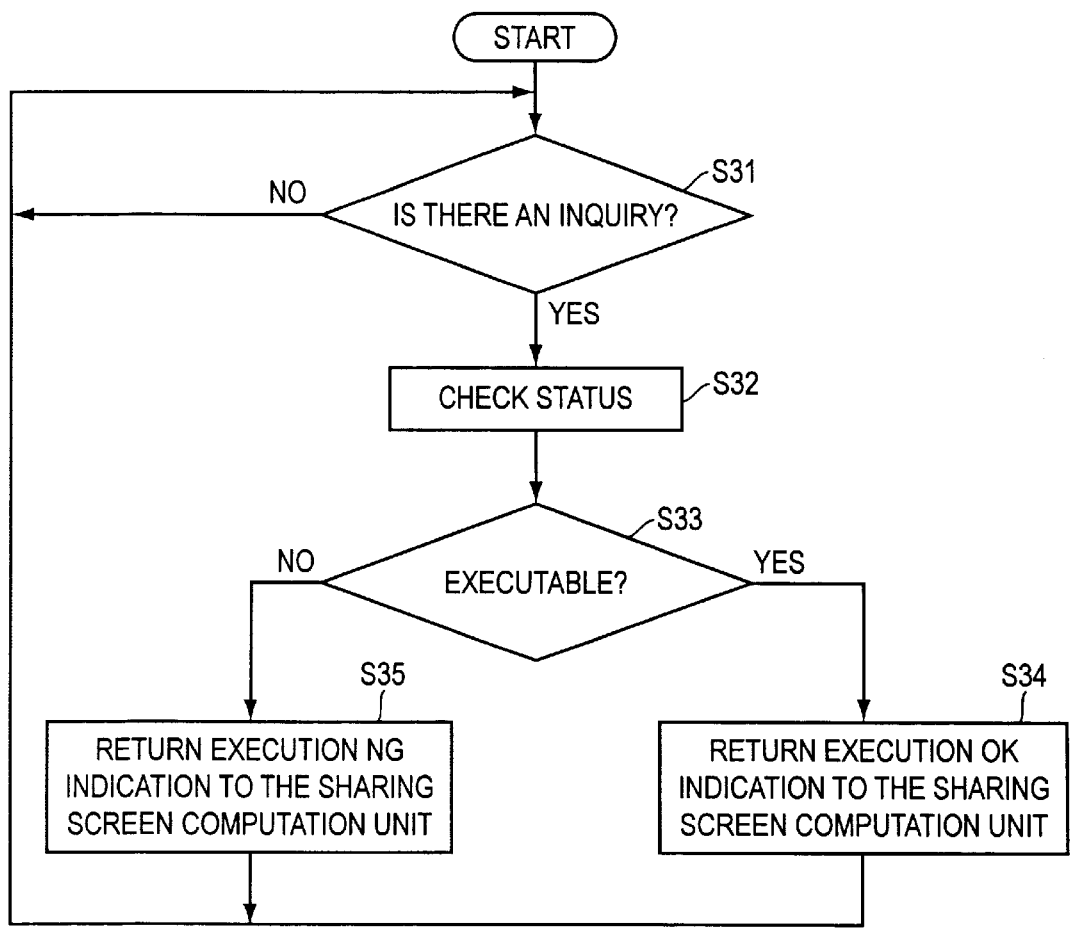
FIG. 7 is a flowchart showing an outline of processing of a recomputation execution determination unit in an embodiment of a cooperative work support system according to the present invention.

Next, FIG. 7 is a flowchart showing an outline of processing of the recomputation execution determination unit 20.

First, the recomputation execution determination unit 20 determines whether an inquiry is issued from the shared screen computation unit 17, and waits until an inquiry arrives (step S31). As described previously, it checks whether an environment for recomputation on the shared screen is established (step S32). If a result of status checking (step S33) indicates that recomputation on the shared screen is executable, the recomputation execution determination unit 20 returns an execution OK indication to the shared screen computation unit 17 (step S34), and if an environment for recomputation on the shared screen is not yet established, returns an execution NG indication to the shared screen computation unit 17 (step S35). Subsequently, the recomputation execution determination unit 20 returns to the step S31 and repeats the above processing.

Figure 8:
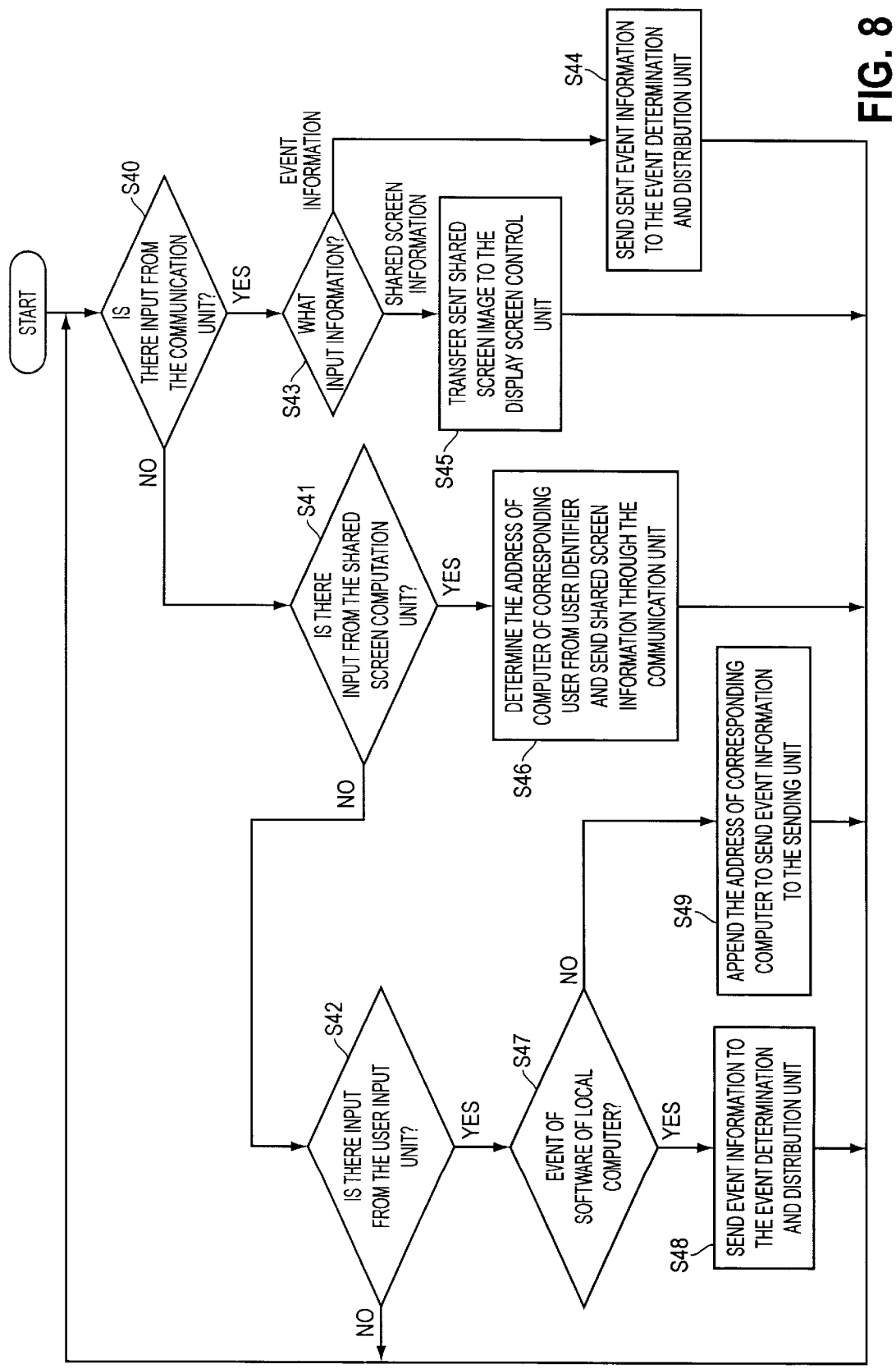
FIG. 8 is a flowchart showing an outline of processing of a sharing unit in an embodiment of a cooperative work support system according to the present invention.

FIG. 8 is a flowchart showing an outline of processing of the sharing unit 16.

First, whether information inputted through the network 1 arrives from the communication unit 11 is determined (step S40). When it is determined that there is no input information from the communication unit 11, whether an input from the shared screen computation unit 17 exists (step S41) is determined. When it is again determined that there is no input, whether there is a user input through the user input unit 12 is determined (step S42), if it is determined that there is no user input, the sharing unit 16 returns to the step S40 and repeats processing, beginning with checking for the existence of input from the communication unit 11.

When it is determined in step S40 that there is input information from the communication unit 11, the sharing unit 16 determines whether it is event information based on an input from a user of another personal computer or the display information of a shared screen from a personal computer having a shared application (step S43).

If it is event information, the sharing unit 16 sends the sent event information to the event determination and distribution unit 13 (step S44) and then returns to the step S40. When it is determined that input information from the communication unit 11 is the display information of the shared screen, the sharing unit 16 transfers the sent display information of the shared screen to the display screen control unit 14 and displays it on the screen of the display unit 15 (step S45), and then returns to the step S40.

When it is determined in the step S41 that the display information of an updated shared screen has been inputted from the shared screen computation unit 17, the sharing unit 16 obtains the address of a personal computer of a corresponding user on the network 1 from a user identifier contained in the input information, and sends the display information of the display screen to the personal computer of the user through the communication unit 11 (step S46), and then returns to the step S40 and repeats the above processing.

When it is determined in the step S42 that there is a user input from the user input unit 12, the sharing unit 16 locates an application to which the inputted event relates (step S47), and if it is an application operating on the local computer, sends the event information to the event determination and distribution unit 13 (step S48). If the application is operating on another personal computer, the sharing unit 16 sends the event information to the communication unit 11 along with the address of that personal computer on the network 1, and then returns to the step S40 and repeats the above processing.

Figure 9:
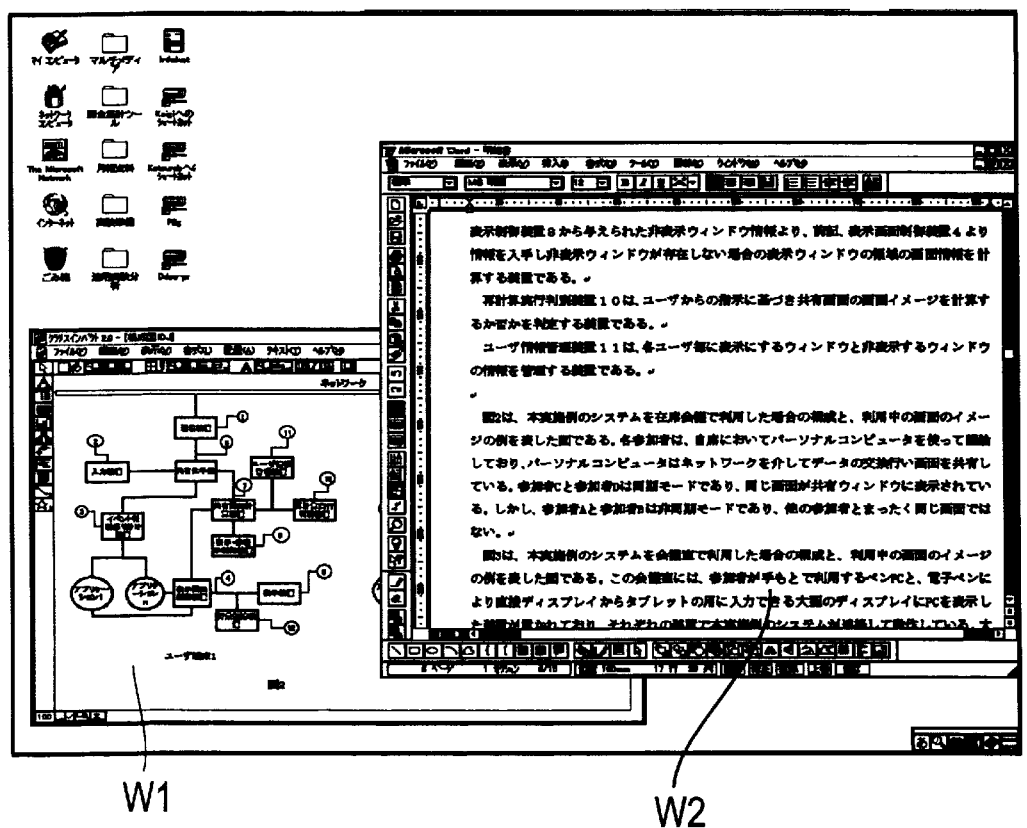
FIG. 9 shows a display example of a shared screen in an embodiment of a cooperative work support system according to the present invention.

A display example of a shared screen in a cooperative work support system of the above configuration will be described with reference to FIGS. 9 to 11. In this example, a personal computer in which a shared application is installed is a personal computer 2A of participant A and a display/non-display management table TBL of the user information management unit 21 is set as shown in FIG. 3.

Now, suppose two windows, W1 (window ID=1) and W2 (window ID=2), have been opened by an input instruction from one participant in a meeting. Since these two windows W1 (window ID=1) and W2 (window ID=2) are set to "display" by all the participants A to D, as shared screens, the screens of two windows shown in FIG. 9 are identically displayed on the screen of the personal computers 2A to 2D of all the participants A to D.

Figure 10:
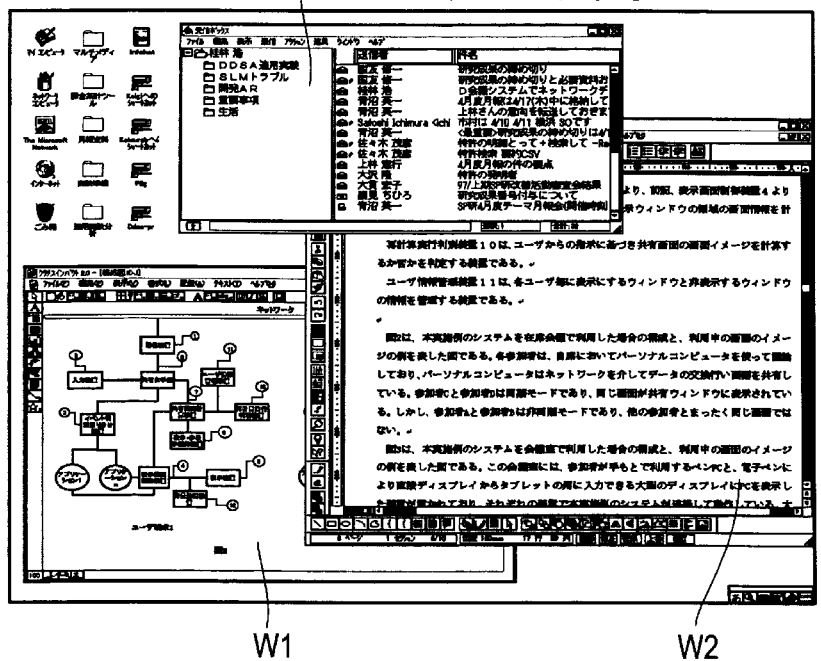
FIG. 10 shows a display example of a shared screen in an embodiment of a cooperative work support system according to the present invention.

Next, when an indication to open a window 3 (window ID=3) in addition to the two windows has been made by one of the participants, the display screen control unit 14 of the personal computer 2A including the shared application that has received the instruction displays the third window W3, in addition to the two windows W1 and W2, on the display screen of the local personal computer 2A, as shown in FIG. 10.

Since the window W3 is set to "display" for the participant B, information of the same display screen as in FIG. 10 is sent to the personal computer 2B of the participant B as the display information of the shared screen through the sharing section 16 and the communication unit 11.

However, since the window W3 is set to "non-display" for the participants C and D, as described previously, the bit map information of an image beneath the window W3 when the window W3 is excluded from the screen display in FIG. 10 is collected in the recomputation unit 19, and is supplied to the shared screen computation unit 17 through the display control unit along with information about the position and size of the image. The shared screen computation unit 17 generates the display information of exactly the same screen as in FIG. 9 using the bit map information and the position and size information and sends it to the computers 2C and 2D of the participants C and D as the display information of the shared screens.

With the window W3 opened, even if the shared screens are updated because of user inputs to the windows W2, W1, and W3, in exactly the same way, the window W3 is not displayed on the screen of the computers 2C and 2D of the participants C and D.

In the way described above, the window W3 is not displayed on the screen of the computers 2C and 2D of the participants C and D, so that the participants A and B can discuss the contents displayed on the window W3 with the contents of the window W3 secret to the participants C and D. Moreover, in the case of this embodiment, the fact that the window W3 is displayed to other participants A and B can be hidden from the participants C and D.

Figure 11:
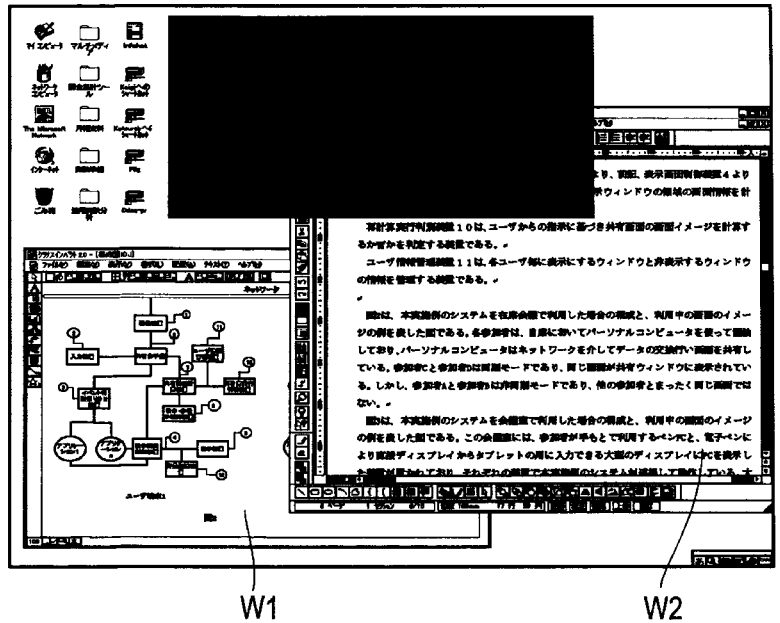
FIG. 11 shows a comparison with a display example of a shared screen in an embodiment of a cooperative work support system according to the present invention.

For example, one possible method for hiding the contents of the window 3 is to display a single color, e.g., black as the image contents of an area where the window W3 is displayed, as shown in FIG. 11. With this method, however, the existence of the window W3 would be undesirably revealed to the participants from whom its contents are to be hidden. In this respect, in the case of the embodiment described above, since the recomputation unit 19 recomputes screen information as if an opened window did not exist, even the existence of the window W3 to be hidden can be hidden.

[Second Embodiment]

In the first embodiment, for a non-display window, when the window is to be hidden, a portion hidden by the window was recomputed by the recomputation unit 19 to form display information. However, the recomputation is time-consuming, so that a long wait time might be required until the shared screens are updated after an event by user input occurs.

Figure 12:
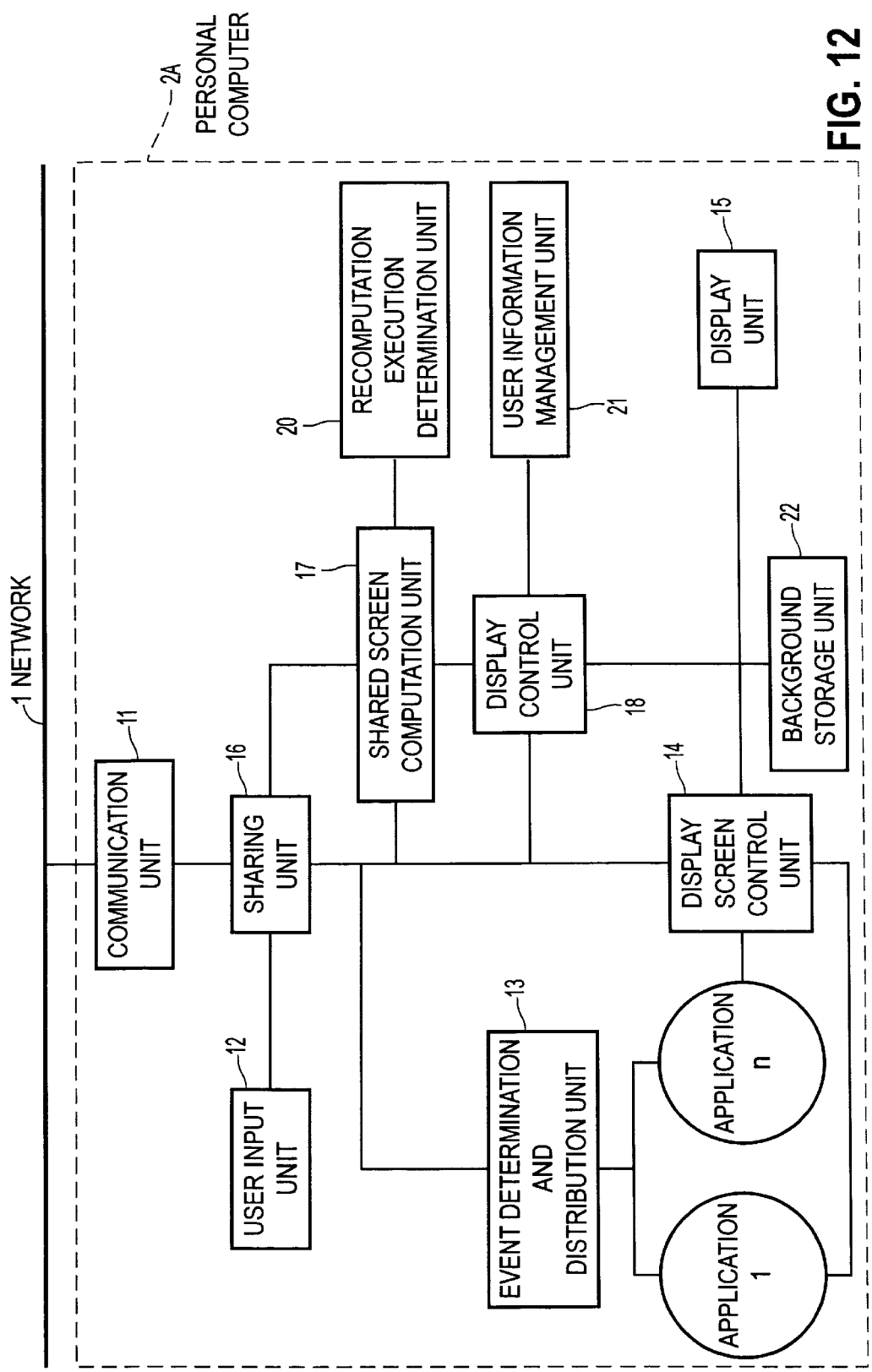
FIG. 12 is a functional block diagram for major units of a second embodiment of a cooperative work support system according to the present invention.

The second embodiment has improved this point. FIG. 12 shows a block diagram for the processing functions of a personal computer in the second embodiment. It is different from the block diagram for the processing functions of a personal computer in the first embodiment in FIG. 1 in that the background storage unit 22 is provided in place of the recomputation unit 19.

The background storage unit 22 stores, for each window, bit map information to be set in an area in which a window is being displayed, when the window is hidden. In other words, when a window is to be displayed on a desktop, an area hidden by the window to be displayed is cut out and registered before the window is displayed.

The background storage unit 22 obtains information to be stored, from display information sent from the display screen control unit 14. Upon receipt of an inquiry from the display control section 18, the background storage unit 22 returns the stored bit map information to the display control unit 18, based on non-display window information afforded from the display control unit 18.

In the case of obtaining information to be returned to the display control unit 18 from stored background information, background information at the time when operations have been performed so that a target window comes out on top of other overlapping windows is returned. In other words, instead of returning pieces of background information stored in association with the windows without modification, the pieces of background information stored in association with the windows are interchanged so that a window specified as non-display overlaps on windows specified as display.

The second embodiment is similar to the first embodiment in that the display control unit 18 inquires of the user information management unit 21 according to an inquiry from the shared screen computation unit 17, determines a window to be hidden for each user, inquires of the display screen control unit 14 to find the position and size of the window to be hidden, and returns the position and size of the window to be hidden and bit map information of the area to the shared screen computation unit 17. However, in the second embodiment, bit map information of the screen display of the area in which the window has existed is obtained from the background storage unit 12.

The configuration of other units is exactly the same as that in the first embodiment described previously.

Figure 13:
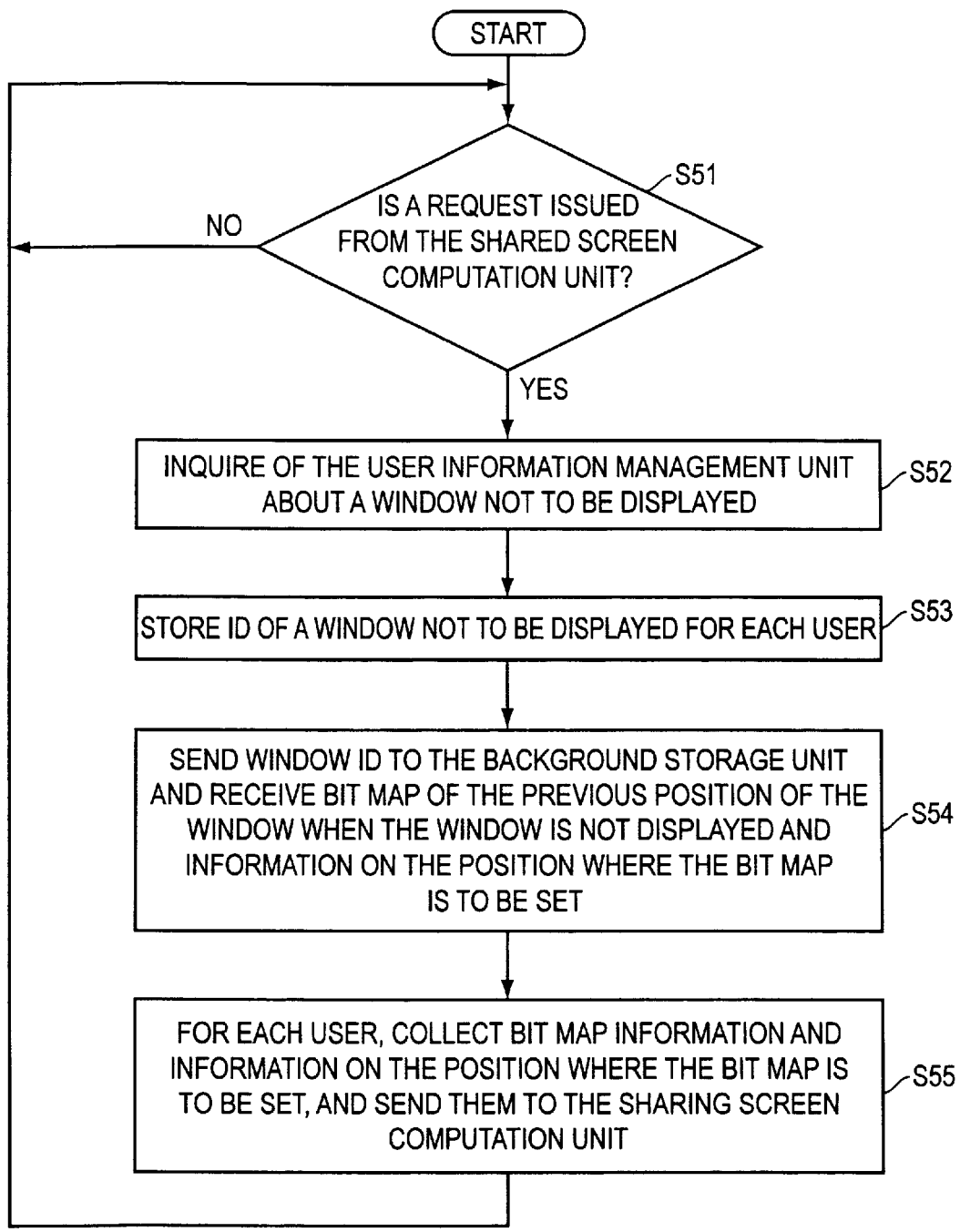
FIG. 13 is a flowchart showing an outline of processing of the display control unit in the second embodiment.

FIG. 13 is a flowchart showing an outline of processing of the display control unit 18 of the second embodiment. In the second embodiment, as described previously, a background storage method is employed as a method for creating bit map information to fill the display area of a non-display window.

Namely, the display control unit 18 determines whether an inquiry request arrives from the shared screen computation unit 17 (step S51), and when an inquiry request arrives, inquires of the user information management unit 21 about a non-display window for each participant in the meeting (step S52), and stores the window ID of a non-display window sent from the user information management unit 21 for each participant (step S53).

Next, the display control unit 18 sends a window ID to be hidden for each participant to the background storage unit 22, and as a result, receives the following information sent from the background storage unit 22: bit map information of the position where the window has existed when it is not displayed, and information about the position where the bit map information is to be set (step S54).

Next, the display control unit 18 collects, for each participant in the meeting, bit map information and information about the position where the bit map information is to be set, and sends them to the shared screen computation unit 17 (step S55). Subsequently, the display control unit 18 returns to the step S51 and repeats the above processing.

Figure 14:
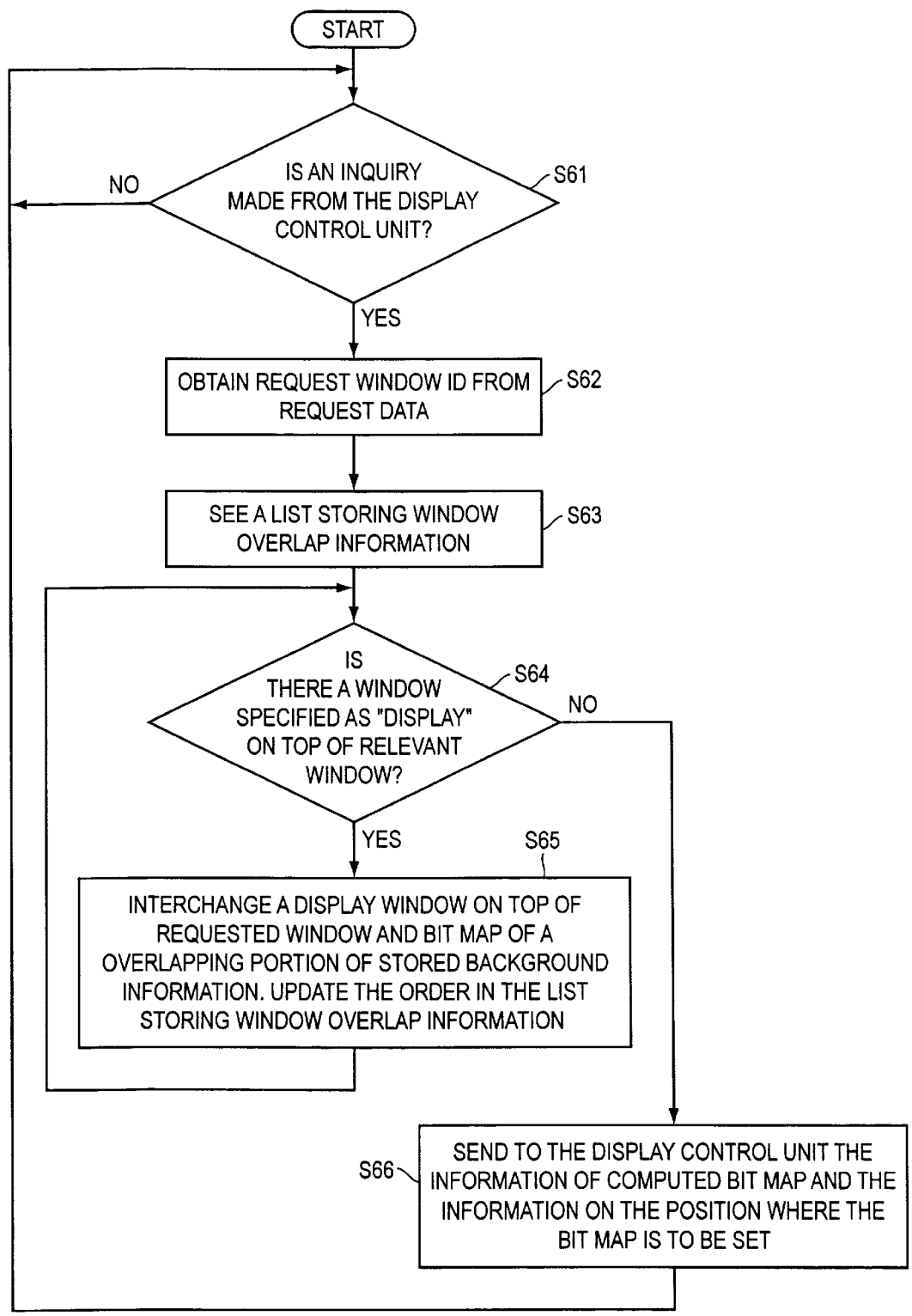
FIG. 14 is a flowchart showing an outline of processing of a background storage unit in the second embodiment.
Figure 15:
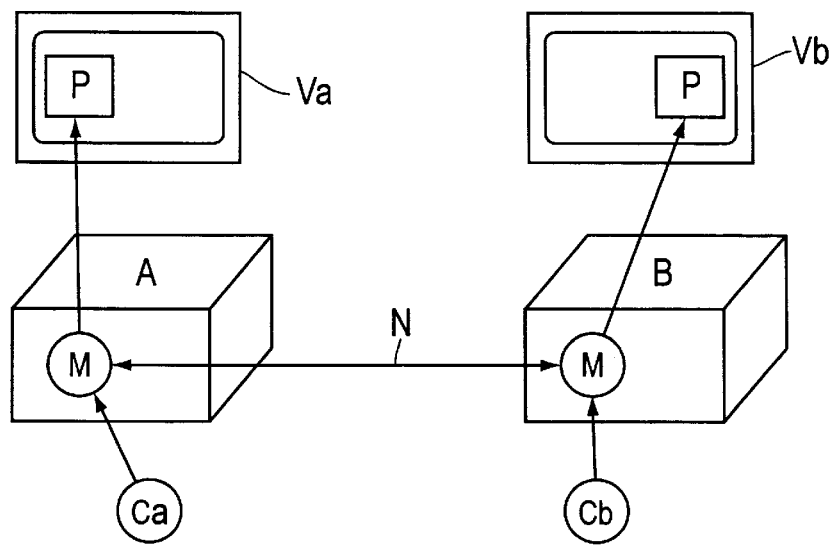
FIG. 15 is a diagram for explaining a screen sharing system.

Next, FIG. 14 is a flowchart showing an outline of processing of the background storage unit 22. First, the background storage unit 22 determines whether an inquiry request arrives from the display control unit 18 (step S61), and when an inquiry request arrives, proceeds to the next step S62 and obtains a window ID requiring bit map information from the request information.

Next, the background storage unit 22 checks a list of overlapping windows (step S63) and determines whether a window specified as "display" exists on top of a target window (step S64). If a window specified as "display" exists on top of the target window, the background storage unit 22 transposes a display window immediately above the requested window and bit map information of an overlapping portion of stored background information, and also transposes the order of a list of overlapping windows (step S65).

If it is determined in the step S64 there is no window specified as "display" on top of the target window, the background storage unit 22 sends obtained bit map information and information about the position where the bit map information is to be set, to the display control unit 18, and then returns to the step S61 and repeats the above processing.

In the second embodiment, as described above, bit map information to be set in an area of a window to be hidden can be quickly obtained from information stored in the background storage unit 22, so that high-speed processing can be performed.

[Variation]

In the first and second embodiments described above, screen images, which are the outcomes of an application operating on one personal computer, are shared. Namely, screen images of one personal computer are shared by a plurality of personal computers.

Accordingly, since only screen images of participants required for discussions, of participants in the meeting, have to be shared, the participants' shared screen images can be replaced as required. In other words, at one time, screen images by an application of the personal computer 2A of the participant A can be shared by all the participants, and at a different time, screen images by an application of the personal computer 2B of the participant B can be shared by all the participants.

However, in the first and second embodiments described above, applications that can be started by the participants A and B respectively cannot be shared by all participants at the same time.

However, a virtual desktop screen formed by coupling the results of operations by applications started by a plurality of personal computers can be recomputed based on the results of an operation by an event inputted to an application wherein the event is distributed to a personal computer in which the application has been started. In this case, the sharing unit 16 has a function to transfer events to applications that have been started in dispersion by the plurality of personal computers and refine screen images, which are the operation results of the applications.

Although examples of hiding a window for each user as well have been described, windows can be hidden only on a window basis.

In the embodiments 1 and 2, a description has been made with a meeting in mind, but various usage modes are possible. For example, an operation explanation and trouble consultation can be made remotely through a network between a PC (personal computer) or groupware system's administrator and users. In other words, a user who is unfamiliar with an operation method or encounters a trouble contacts the administrator and uses a system of the embodiments, whereby the administrator shares an application the user is using and explains a use method with demonstration through the network, so that the trouble can be solved. However, in the case of applications of screen sharing type, inherently, since special-purpose applications are used to share a screen, it is impossible to explain software to be used by users or solve trouble with the software. Namely, the screen sharing type allows only special software to be shared between users and an administrator and is not suitable for an operation explanation or trouble solving through the sharing of general software the user is using. Also, when an attempt is made to solve trouble by creating the same situation as when the trouble occurred by starting all software components having been active when the trouble occurred, it may be undesirable that the display results of the active software components are exposed to the administrator. The embodiments are also effective for such a case.

In the case of screen sharing software, since a different software version may cause an unstable operation or disable operation, the software's version must always be kept in mind, and it is necessary to use the most recent version as required and replace software according to persons with which to communicate. However, in the case of application sharing type, since application software possessed by one of participants is shared, the participants need not concern themselves with the consistency of the versions of application software components installed by all participants. Also, in the case of the screen sharing type, a meeting cannot be held unless all participants have particular application software, while, in the case of the embodiments, documents can be created by freely selecting optimum application software in addition to the software that all the participants have. At this time, the display of the application can be controlled according to persons.

As described above, according to the present invention, in a cooperative work support system using an application sharing system, when a consultation is being made while sharing screens, a meeting can be conducted while hiding secret windows from others. Accordingly, participants in the meeting can view reference documents of their own while keeping track of a flow of the meeting.

Information to be shared or not to be shared can be determined using user information according to persons, and whether to display or hide can be easily managed on a user basis by mere modifications of the setting of user information. Therefore, the present invention can apply to meetings that are polarized by position, such as consultations with other departments.

Beneficially, not only a secret window is simply hidden, but also the window can be hidden without the fact that a specific widow has been hidden being known to others, in a manner that computes display information appearing when the window area has been removed, and creates and displays information on the background.

There is no need to recompute display information appearing when a window to be hidden from others has been removed, so that processing can be performed at high speed.

The problem can be solved that, after a new application is started up, the window is unwillingly revealed to others until it is hidden. In other words, by stopping screen updating after a new application is started up until the window is hidden, it is not known to others that the non-display window has been started up.

What is claimed is:

1. A cooperative work support system comprising:
   a communication unit that communicates with at least other computers;
   a user input unit that accepts a user's input operation and generates an event in response to the input operation;
   an event determination and distribution unit that judges said event generated in a local computer or said event sent from other computers through said communication unit, identifies an application to receive said event, and transfers said event to said identified application;
   a display unit that displays on a display screen the execution result of said application to which said event is transferred by said event determination and distribution unit;

a display screen control unit that controls the display contents of said display screen;

a display control unit that controls whether to display or hide windows displayed in the course of screen display shared with other computers;

a shared screen computation unit that, when screen display information is updated according to the execution results of said application, computes the display information of a shared screen that is to be passed to other computers, based on control of said display control unit;

and a sharing unit including: a function to pass events generated in response to input operations by said user input unit to other computers through said communication unit; a function to pass events generated in response to user input operations by said user input unit or events sent from other computers through said communication unit to said event determination and distribution unit; a function to pass display information of said shared screen that was computed by said shared screen computation unit, to other computers through said communication unit; and a function to pass display information of said shared screen that comes from other computers through said communication unit, to said display screen control unit.

2. The cooperative work support system according to claim 1 which comprises a user information management unit that manages user information indicating for each user whether to display or hide each window, wherein said display control unit determines whether to display or hide each window for each user, based on said user information of said user information management unit.

3. The cooperative work support system according to claim 1 which comprises a recomputation unit that recomputes display information in an area from which a window hidden by said display control unit has been removed.

4. The cooperative work support system according to claim 1 which comprises a background storage unit that, before a new window is displayed on a screen, at least stores display information of an area in which said window is displayed.

5. The cooperative work support system according to claim 1 which comprises a recomputation execution determination unit that determines whether to recompute display information of a shared screen to be displayed, when a screen modification occurs.

* * * * *